United States Patent
Nomoto et al.

(10) Patent No.: US 7,225,196 B2
(45) Date of Patent: May 29, 2007

(54) DATA CONVERSION METHOD AND COMPUTER SYSTEM THEREFOR

(75) Inventors: Toyohiro Nomoto, Yokohama (JP); Norifumi Nishikawa, Machida (JP); Hideomi Idei, Yokohama (JP); Kazuhiko Mogi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 387 days.

(21) Appl. No.: 10/729,536

(22) Filed: Dec. 5, 2003

(65) Prior Publication Data

US 2004/0172392 A1   Sep. 2, 2004

(30) Foreign Application Priority Data

Dec. 6, 2002   (JP) .............................. 2002-355099

(51) Int. Cl.
   *G06F 17/30* (2006.01)
   *G06F 7/00* (2006.01)
(52) U.S. Cl. ....................... 707/101; 707/104.1; 707/10
(58) Field of Classification Search ................ 707/101, 707/104.1, 10
   See application file for complete search history.

(56) References Cited

U.S. PATENT DOCUMENTS

| | | | |
|---|---|---|---|
| 5,493,671 A | 2/1996 | Pitt et al. | |
| 5,708,828 A | 1/1998 | Coleman | |
| 6,161,103 A | 12/2000 | Rauer et al. | |
| 6,643,649 B2 | 11/2003 | Wang et al. | |
| 6,988,134 B2* | 1/2006 | Thorpe et al. | 709/223 |
| 2002/0099748 A1* | 7/2002 | Grosz et al. | 708/446 |
| 2002/0099782 A1* | 7/2002 | Bando et al. | 709/206 |
| 2002/0154332 A1* | 10/2002 | Inai et al. | 358/1.15 |
| 2002/0161754 A1 | 10/2002 | Janssen | |
| 2003/0023758 A1* | 1/2003 | Yoshikawa et al. | 709/247 |
| 2003/0055820 A1 | 3/2003 | Aigen | |
| 2003/0135480 A1* | 7/2003 | Van Arsdale et al. | 707/1 |
| 2004/0002983 A1 | 1/2004 | Ashida et al. | |
| 2004/0093222 A1* | 5/2004 | Sipe et al. | 705/1 |

FOREIGN PATENT DOCUMENTS

JP   2001-022764   1/2001

* cited by examiner

*Primary Examiner*—John Cottingham
*Assistant Examiner*—Kuen S. Lu
(74) *Attorney, Agent, or Firm*—Townsend and Townsend and Crew LLP (57) ABSTRACT

A data conversion job used for data conversion is separated into a data conversion server job for executing conversion processing on a data conversion server and a storage job for instructing a copy of a table on a storage device. Then, the storage job is executed to instruct the storage device to copy the table. The data conversion server job is executed only for fields that need to be converted, and thereby data conversion is performed for the copied table.

This makes it possible to reduce a load of the data conversion server when converting data of a database, and also to enable a designer of a data conversion job to easily design the data conversion job.

12 Claims, 12 Drawing Sheets

| COMMODITY CODE | COMMODITY NAME | CLASSIFICATION CODE A | CLASSIFICATION CODE B | BAR CODE | REGISTRATION DATE |
|---|---|---|---|---|---|
| A0001 | EP8000 | 660 | H1 | 0123456 | 02-08-09 |
| A0002 | EP8001 | 660 | E2 | 1223456 | 02-08-10 |

FIG. 4

| COMMODITY CODE | COMMODITY NAME | CLASSIFICATION CODE A | CLASSIFICATION CODE B | BAR CODE | REGISTRATION DATE |
|---|---|---|---|---|---|
| 881801 | EP8000 | 660-A1PS | B-H1 | 0123456 | 02-08-09 |
| 881802 | EP8001 | 660-A1PS | B-E2 | 1223456 | 02-08-10 |

FIG. 5

| DBMS IDENTIFIER | DB TABLE NAME | TABLE FIELD NAME | STORAGE DEVICE VOLUME | |
|---|---|---|---|---|
| DBMS1 | COMMODITY MASTER | COMMODITY CODE | Vol1 | 351 |
| DBMS1 | COMMODITY MASTER | COMMODITY NAME | Vol2 | 352 |
| DBMS1 | COMMODITY MASTER | CLASSIFICATION CODE A | Vol3 | 353 |
| DBMS1 | COMMODITY MASTER | CLASSIFICATION CODE B | Vol4 | 354 |
| DBMS1 | COMMODITY MASTER | BAR CODE | Vol5 | 355 |
| DBMS1 | COMMODITY MASTER | REGISTRATION DATE | Vol6 | 356 |
| | | | | |
| DBMS1 | A COMPANY'S COMMODITY LEDGER | COMMODITY CODE | Vol11 | 361 |
| DBMS1 | A COMPANY'S COMMODITY LEDGER | COMMODITY NAME | Vol12 | 362 |
| DBMS1 | A COMPANY'S COMMODITY LEDGER | CLASSIFICATION CODE A | Vol13 | 363 |
| DBMS1 | A COMPANY'S COMMODITY LEDGER | CLASSIFICATION CODE B | Vol13 | 364 |
| DBMS1 | A COMPANY'S COMMODITY LEDGER | BAR CODE | Vol14 | 365 |
| DBMS1 | A COMPANY'S COMMODITY LEDGER | REGISTRATION DATE | DETERMINE AT THE TIME OF EXECUTION | 366 |

FIG. 6(a)

```
JOB    PROG="DataConversion"
       PARM="Convert-Inf"
```

FIG. 6(b)

```
JOB    PROG="DataConvert-Server"
       PARM="Separated-Convert-Inf"
```

FIG. 6(c)

```
JOB    PROG="Storage"
       PARM="Copy-Inf"
```

FIG. 7

| INPUT TABLE NAME 1001 | INPUT FIELD NAME 1002 | OUTPUT TABLE NAME 1003 | OUTPUT FIELD NAME 1004 | CONTENTS OF CONVERSION 1005 | |
|---|---|---|---|---|---|
| COMMODITY MASTER | COMMODITY CODE | A COMPANY'S COMMODITY LEDGER | COMMODITY CODE | A COMPANY'S MASTER CONVERSION (COMMODITY CODE) | 1021 |
| COMMODITY MASTER | COMMODITY NAME | A COMPANY'S COMMODITY LEDGER | COMMODITY NAME | COMMODITY NAME | 1022 |
| COMMODITY MASTER | CLASSIFICATION CODE 1 | A COMPANY'S COMMODITY LEDGER | CLASSIFICATION CODE A | A COMPANY'S CLASSIFICATION A (CLASSIFICATION CODE 1) | 1023 |
| COMMODITY MASTER | CLASSIFICATION CODE 2 | A COMPANY'S COMMODITY LEDGER | CLASSIFICATION CODE B | A COMPANY'S CLASSIFICATION B (CLASSIFICATION CODE 2) | 1024 |
| COMMODITY MASTER | BAR CODE | A COMPANY'S COMMODITY LEDGER | BAR CODE | BAR CODE | 1025 |
| COMMODITY MASTER | REGISTRATION DATE | A COMPANY'S COMMODITY LEDGER | REGISTRATION DATE | REGISTRATION DATE | 1026 |

| INPUT TABLE NAME | INPUT FIELD NAME | OUTPUT TABLE NAME | OUTPUT FIELD NAME | CONTENTS OF CONVERSION |
|---|---|---|---|---|
| COMMODITY MASTER | COMMODITY CODE | A COMPANY'S COMMODITY LEDGER | COMMODITY CODE | A COMPANY'S MASTER CONVERSION (COMMODITY CODE) |
| COMMODITY MASTER | CLASSIFICATION CODE 1 | A COMPANY'S COMMODITY LEDGER | CLASSIFICATION CODE A | A COMPANY'S CLASSIFICATION A (CLASSIFICATION CODE 2) |
| COMMODITY MASTER | CLASSIFICATION CODE 2 | A COMPANY'S COMMODITY LEDGER | CLASSIFICATION CODE B | A COMPANY'S CLASSIFICATION B (CLASSIFICATION CODE 1) |

DATA CONVERSION METHOD AND COMPUTER SYSTEM THEREFOR

BACKGROUND OF THE INVENTION

The present invention relates to a data conversion method, and more particularly to a data conversion method that is suitable for the use in a large scale database, and that enables a reduction in load of a data conversion server as well as an easy design of a conversion program.

In recent years, database systems are more and more being developed, and are therefore becoming systems that are indispensable to company activities. A database system is not only used in one computer system, but it is often exported to other computer systems, or partial data of its table is converted before the table is used. In particular, as a scale of a database system becomes larger, such data conversion is more often required.

In such a case, for the purpose of applying certain table data to various kinds of uses, it is necessary to modify an original table so as to create a plurality of application-specific tables, and then to use each of the tables in each system. Therefore, a data conversion program for creating those tables is required. The data conversion program obtains an input and table data from the storage device in which the data is stored, and executes data conversion required for the use of a system, and then writes data after the conversion to a storage device as table data that is an output. For example, in Japanese Patent Application Laid-Open No. 2001-22764, the technology for converting a data file in a tabular format into product information database is disclosed.

Here, field values of a table in which input data is stored can be classified into two kinds of data: field data which needs to be rewritten, and field data which does not need to be rewritten. The field data which needs to be rewritten is field data which needs to be rewritten for a different use because this field data differs depending on the use of the system. On the other hand, the field data which does not need to be rewritten is field data which does not need to be rewritten because this field data of the original table is used in common. These classifications differ depending on the use of the system to which a table is output. Additionally, how to classify the field values is also flexible depending on the use.

For these reasons, in a data conversion job of the conventional data conversion program, irrespective of the classifications of fields in a table, target table data to be converted is entirely read into a data conversion server in which a data conversion program operates. Then, only field data for which rewriting is specified is converted. After having executed the data conversion in the specified fields of the obtained table, the converted data is written as output table data. According to another data conversion method using a data conversion job, a table as an input is first copied, and then only required field data of the copied table is converted.

Here, the data conversion job is described as a job definition in which a model, an obtaining method, and a conversion method, of input/output data, and the origin, and processing, of data are described. The job definition is interpreted and executed by a job execution engine.

In the data conversion method according to the prior art, all table data to be converted were read into the data conversion server used for operating the data conversion program. Under such circumstances, because I/O load and all of the data read into the data conversion server required CPU processing, data which did not need to be converted also caused a CPU load. This overhead produced a problem of treatment performance. Moreover, in the method for designing a data conversion job in which only required data is converted, a designer of a data conversion job was required to have extra skills such as knowledge about the storage device for storing the table data, how to judge field data, and how to manage the processing order of the field data.

Thus, the conventional method had the problem of treatment performance because of the load being placed on the data conversion server, or the problem of high skills which a data conversion job designer is required to have.

The present invention is devised to solve the above-mentioned problems. An object of the present invention is to provide a method that can reduce a load of a data conversion server when converting data of a database, and that enables a designer of a data conversion job to easily design the data conversion job.

SUMMARY OF THE INVENTION

In a data conversion method for converting table data of a database according to the present invention, to begin with, with reference to table volume mapping information 150 describing a location at which a volume of a table of the DB is stored, a data conversion job definition used for data conversion is separated into a data conversion server job definition used when converting only required fields on a data conversion server and a storage job definition used when giving a storage device an instruction to copy table data as source data before conversion.

The data conversion job definition is created by extracting only the fields that need to be converted. In the storage job definition, a copy-from volume and a copy-to volume which are read from the table volume mapping information are described.

Then, a job execution engine is requested to execute the storage job definition so as to give an instruction to storage, and consequently the volume containing the table is copied.

Next, the job execution engine is requested to execute the data conversion server job definition so that the table is accessed with reference to the table volume mapping information, and thereby only required fields are converted, and field data after the conversion is then written as table data after copy.

DESCRIPTION OF THE PREFFERRED EMBODIMENT

Embodiments according to the present invention will be described with reference to FIG. 1 or 11 as below.

In this embodiment, a data conversion method whereby as a table of a database, commodity master data is converted to create a commodity ledger will be described. For example, a case where an A company's commodity ledger which is a commodity ledger of A company is created from commodity master data will be considered. A company's commodity ledger is used as commodity master data for A company.

[Configuration of Computer System for Data Conversion]

To begin with, a computer system used for data conversion according to the present invention will be described with reference to FIG. 1.

Figure 1:
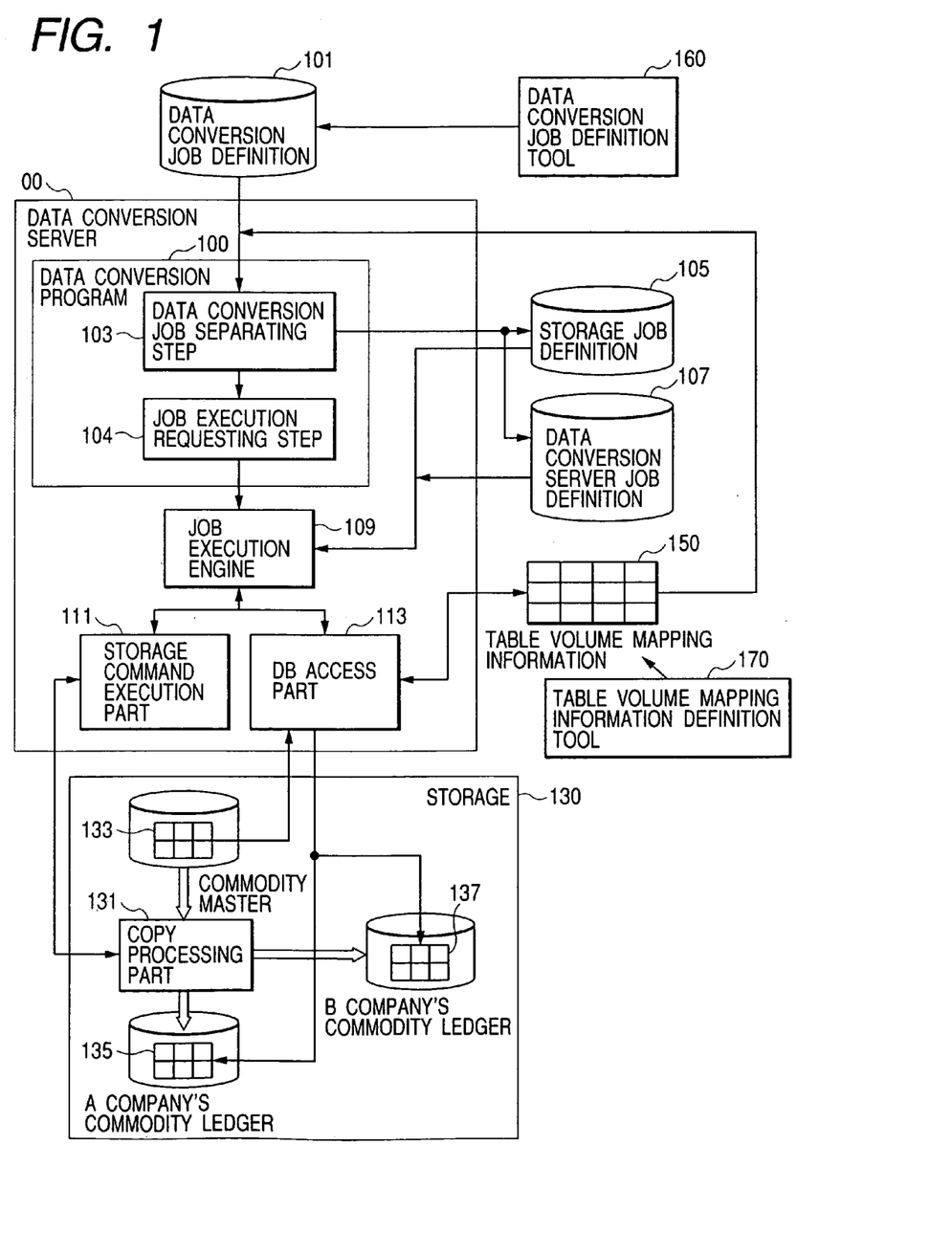
FIG. 1 is a configuration diagram schematically illustrating a computer system for data conversion according to the present invention.

FIG. 1 is a configuration diagram schematically illustrating the computer system for data conversion according to the present invention.

The computer system for data conversion according to the present invention comprises a data conversion server 00 and storage 130. In the data conversion server 00, a data conversion is program 100 and a job execution engine 109 are executed as programs.

The data conversion program 100 is roughly classified into a data conversion job separating step 103 and a job execution requesting step 104.

The data conversion job separating step 103 reads a data conversion job definition 101 and table volume mapping information 150, and then separates them into two job definitions, that is to say, a storage job definition 105 and a data conversion server job definition 107, before storing the two job definitions in a disk unit, or the like.

The table volume mapping information 150 is information into which table information for conversion and volume information for storing the table information are combined. The table volume mapping information 150 will be described in detail later. The job definition is data used to define a job to be executed in the job execution engine. The job definition is divided into processing and a part for defining data relating to the processing.

A data conversion job definition tool 160 is a tool for editing the data conversion job definition 101. A table volume mapping information definition tool 170 is a tool for defining the table volume mapping information 150. These tools may also be mere editors, or they may also be devised to allow interactive data creation.

If the data conversion job separating step 103 is executed in the data conversion program 100, then the job execution requesting step 104 is executed.

The job execution requesting step 104 requests the job execution engine 109 to execute the storage job definition 105 and the data conversion server job definition 107 that have been separated.

The job execution engine 109 executes these jobs by use of two functions: one of them is a storage command execution part 111, and the other is a DB access part 113.

The storage command execution part 111 instructs the storage 130 to copy a volume constituting the storage.

The DB access part 113 is a function of accessing a database, and is called from the job execution engine 109 as an access library of the database.

On the receipt of a command from the storage command execution part of the data conversion server 00, a copy processing part 131 copies the commodity master 133 on a volume basis. Data of the commodity master in the copied volume is then converted into an A company's commodity ledger 135 and a B company's commodity ledger 137.

A data conversion server job which is executed in the job execution engine 109 is a job that converts only data of specified fields. A storage job is a job that, through the storage command execution part 111, specifies a volume and thereby instructs the storage to copy the volume. Incidentally, these jobs will be described in detail later.

In FIG. 1, the data conversion program 100 comprises the data conversion job separating step 103, the data conversion processing execution step 109, the storage command execution part 111, and the DB access part 113. The data conversion program 100 stores the data conversion job definition 101 and the table volume mapping information 150.

Next, a hardware configuration of the computer system for data conversion according to the present invention will be described with reference to FIG. 2.

Figure 2:
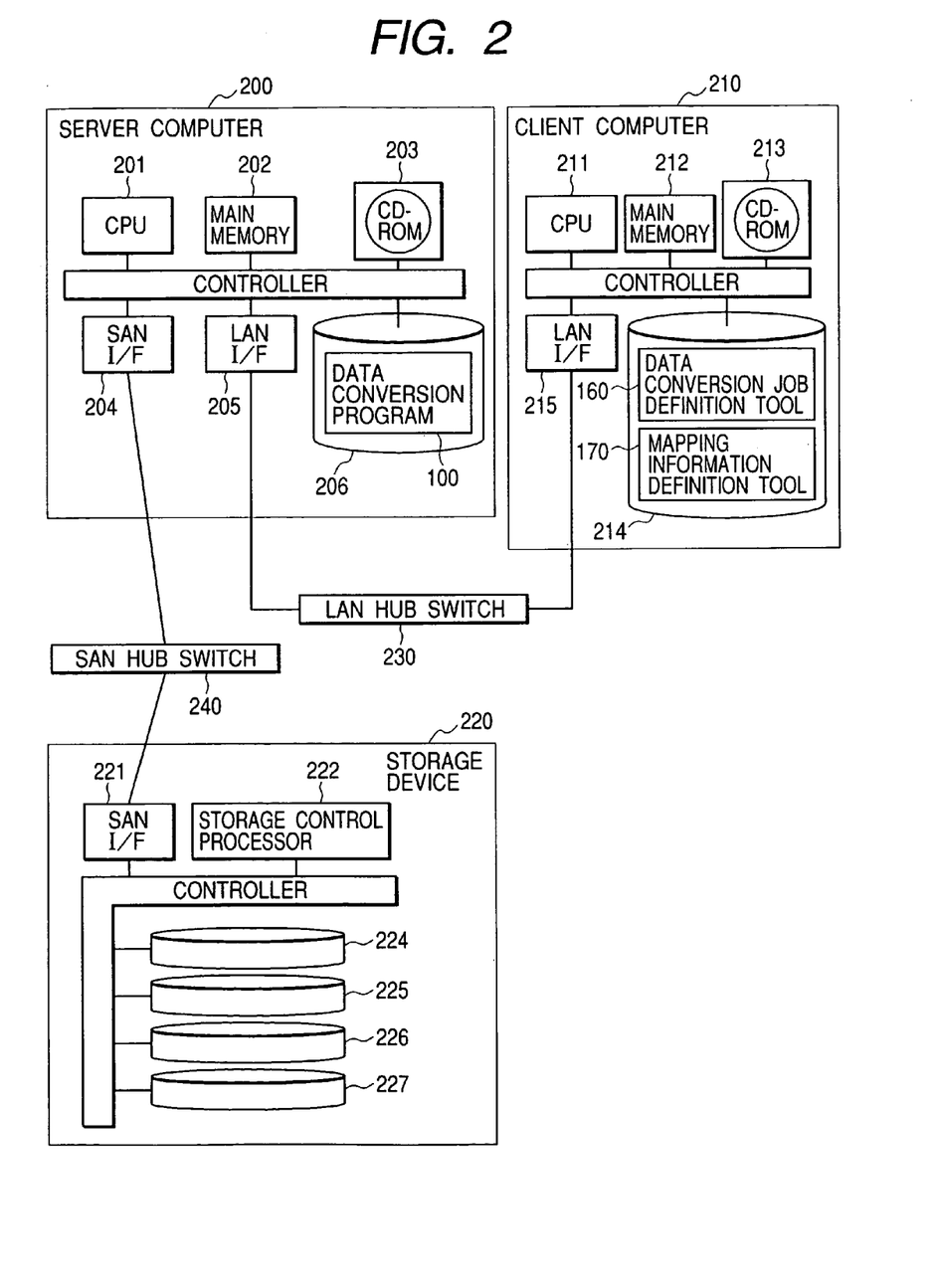
FIG. 2 is a diagram illustrating a hardware configuration of the computer system for data conversion according to the present invention.

FIG. 2 is a diagram illustrating the hardware configuration of the computer system for data conversion according to the present invention.

The hardware configuration of the computer system according to the present invention comprises a server computer 200, a client computer 210, and a storage device 220.

A connection between the server computer 200 and the client computer 210 is made through a LAN I/F 205, a LAN I/F 215, and a LAN hub switch 230, which form a LAN (Local Area Network).

In addition, a connection between the server computer 200 and the storage device 220 is made through a SAN I/F 204, a SAN I/F 221, and a SAN hub switch 240, which form a SAN (Storage Area Network) that is a network exclusively used for storage.

The server computer 200 operates as the data conversion server 00 described in FIG. 1. The server computer 200 has a configuration in which a CPU 201, a main memory 202, a CD-ROM unit 203, the SAN I/F 204, the LAN I/F 205, and a disk unit 206 are connected through a controller.

Programs including the data conversion program 100 and the job execution engine 109 as well as data including the data conversion job definition 101 and the table volume mapping information 150, which were illustrated in FIG. 1, are stored in the disk unit 206. The programs and the data are loaded into the main memory 202 at the time of execution, and the CPU 201 executes the programs.

It is to be noted that these programs and data may also be stored in the disk units 224 through 227 of the storage device 220.

The client computer 210 is a computer that is operated by a user to give an instruction to the server. The client computer 210 has a configuration in which a CPU 211, a main memory 212, a CD-ROM unit 213, the LAN I/F 215, and a disk unit 214 are connected through a controller.

The disk unit 214 of the client computer 210 stores the data conversion job definition tool 160 and the mapping information definition tool 170. By executing these tools as programs, it is possible to create the data conversion job definition 101 and the table volume mapping information 150.

The storage device has a configuration in which the SAN I/F 221, a storage control processor 222, the disk units 224 through 227 are connected to through a controller.

The disk units 224 through 227 are accessed from the server computer 200 on a volume basis. The volume is a logical unit. In addition, the copy processing part 131 shown in FIG. 1 is a function that is executed by the storage control processor 222 on the receipt of an instruction from the server computer 200.

Incidentally, although the computer system in this embodiment comprises the server computer 200 and the client computer 210, the computer system may also be constituted of one computer. Moreover, a plurality of server computers 200 and a plurality of client computers 210 may constitute the computer system. Further, although the number of the storage computer 220 is one in this embodiment, a plurality of the storage computers 220 may also be connected.

[Data Structure for Data Conversion]

Next, data structures for data conversion according to the present invention will be described with reference to FIG. 3 or 9.

As described with reference to FIG. 1, this embodiment explains an example in which the commodity master 133 is converted into the A company's commodity ledger 135.

Therefore, structures of the commodity master 133 and the A company's commodity ledger 135 which are inputs of data conversion will be described with reference to FIGS. 3 and 4.

Figure 3:
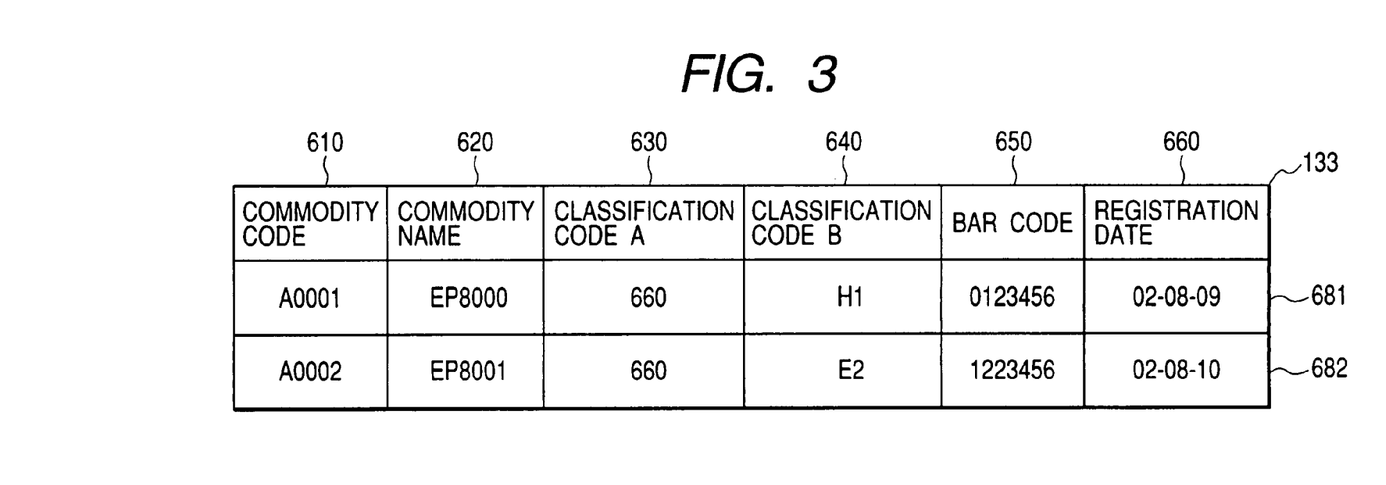
FIG. 3 is a schematic diagram illustrating a table of a commodity master 133.

FIG. 3 is a schematic diagram illustrating a table of the commodity master 133.

Figure 4:
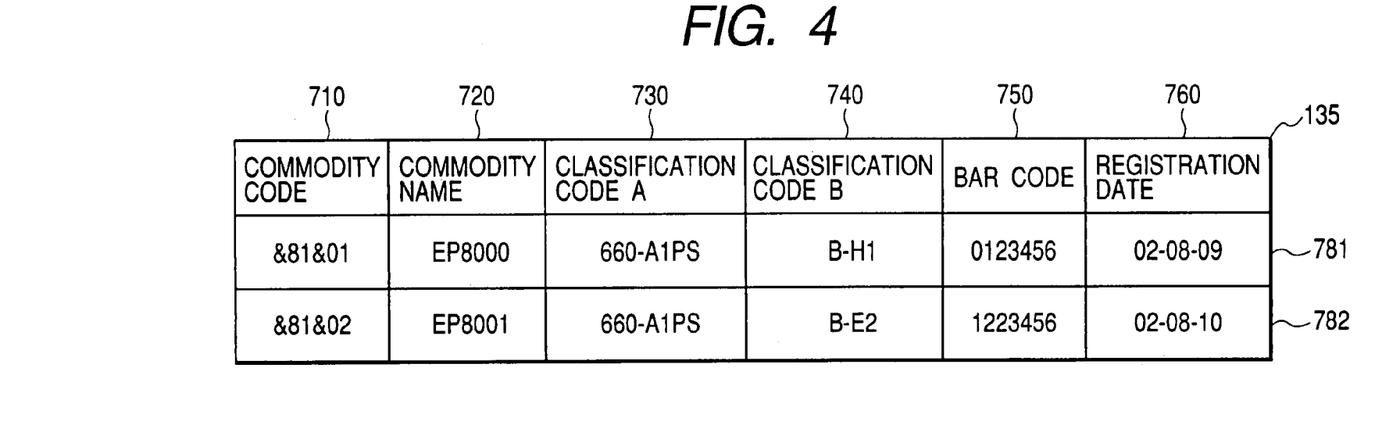
FIG. 4 is a schematic diagram illustrating a table of an A company's commodity ledger 135.

FIG. 4 is a schematic diagram illustrating a table of the A company's commodity ledger 135.

As shown in FIG. 3, the commodity master 133 has the following fields: a commodity code 610, a commodity name 620, a classification code A:630, a classification code B:640, a bar code 650, and registration date 660.

In this embodiment, a record 681 and a record 682 as shown in FIG. 3 are stored as values.

Each of the records has an A company's commodity code 610, the commodity name 620, a classification code A 630, a classification code B 640, the bar code 650, the registration date 660.

As shown in FIG. 4, the A company's commodity ledger 135 has the same fields as those of the commodity master 133. The fields of the A company's commodity ledger 135 are a commodity code 710, a commodity name 720, a classification code A 730, a classification code B 740, a bar code 750, and registration date 760. These fields are made from the fields of the commodity master 133 in a manner that each field corresponds to a field having the same name. However, special attention should be paid to the fields of the commodity code 710 and the classification code A 730. In these two fields, data are stored after data conversion, whereas in the other fields, data of each corresponding field of the commodity master 133 is stored just as it is.

In this embodiment, as shown in FIG. 4, the records 681, 682 of the commodity master 133 correspond to records 781, 782 of the A company's commodity ledger 135 respectively.

Next, the table volume mapping information 150 will be described with reference to FIG. 5.

Figure 5:
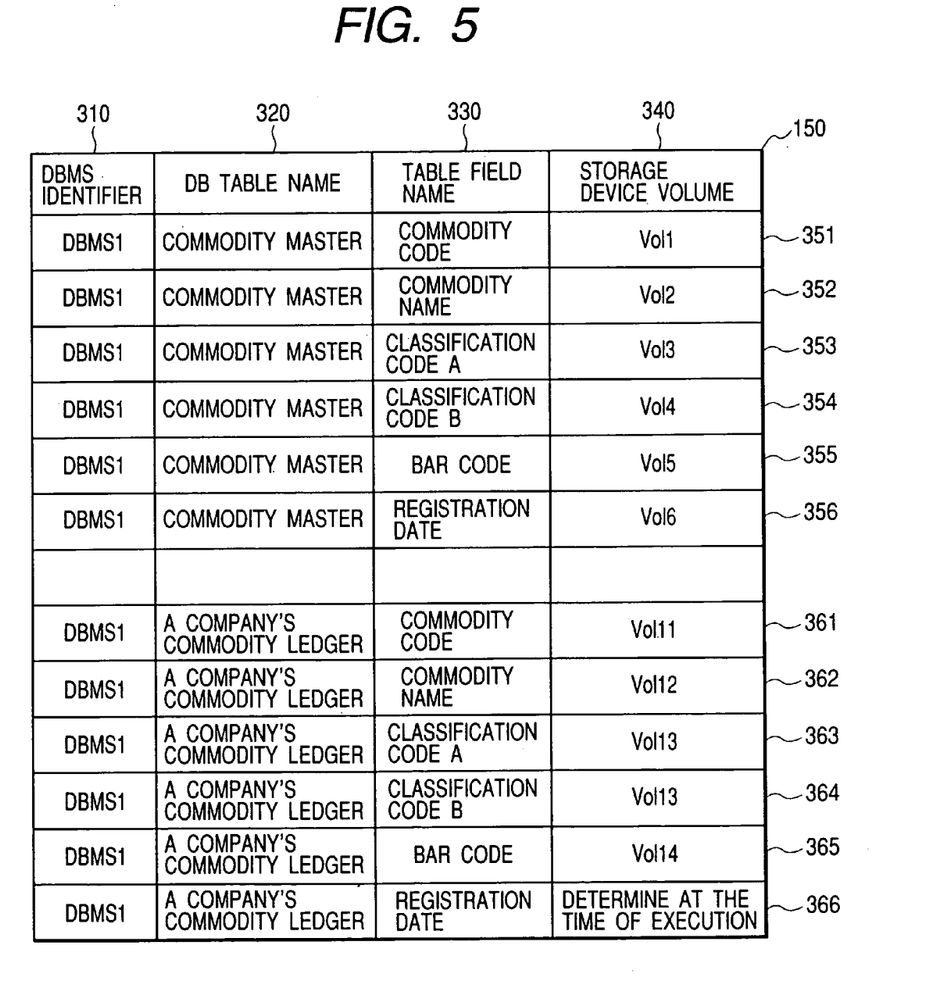
FIG. 5 is a schematic diagram illustrating table volume mapping information 150.

FIG. 5 is a schematic diagram illustrating the table volume mapping information 150.

The table volume mapping information 150 is a table used to associate a logical configuration of a table relating to data conversion with a volume stored.

As shown in FIG. 5, the table volume mapping information 150 has the following fields: a DBMS identifier 310, a DB table name 320, a table field name 330, and a storage device volume 340.

The DBMS identifier 310 is a field in which a value for identifying a DBMS (Data Base Management System) to be handled is stored.

The DB table name 320 is a field in which a DB table name stored in the DBMS indicated by the DBMS identifier 310 is stored.

The table field name 330 is a field in which a field name of a table indicated by the DB table name 320 is stored.

The storage device volume 340 is a field in which a volume identifier in the storage device 130 storing a field indicated by a value of the table field name 330 is stored.

As for the storage device volume 340, a user is required to describe beforehand information about a copy-from table, which is used to execute the data conversion according to the present invention, and about a copy-to table to which the copy is made. In an example shown in FIG. 5, records 351 through 356, DB table names 320 of which are "commodity master", are stored as copy-from table information.

In addition, copy-to table information corresponds to records 361 through 366, DB table names 320 of which are "A company's commodity ledger".

However, a copy-to volume may be determined when executing a copy of the volume. When specifying the copy-to volume, describing "determine at the time of execution" in the storage device volume 340 suffices, as shown in the record 366 in FIG. 5. Then, after the copy is completed, the copy-to volume is written to the storage device volume 340 of the record 366.

It should be noted that although each of the DBMS identifier 310, the DB table name 320, the table field name 330, and the storage device volume 340 is constituted of only one field in the example of the table volume mapping information 150 shown in FIG. 5, a plurality of fields may constitute each of them.

In the example of the table volume mapping information 150 shown in FIG. 5, the records 351, 352, 353, 354, 355, 356 are records showing the DBMS identifier 310, the DB table name 320, the table field name 320, and the storage device volume 340 with respect to the commodity master 133; and the records 361, 362, 363, 364, 365, 366 are records showing the DBMS identifier 310, the DB table name 320, the table field name 320, and the storage device volume 340 with respect to the A company's commodity ledger 135.

In the example shown in FIG. 5, for example, the record 351 indicates that data of the "commodity code" field of the "commodity master" in the "DBMS 1" as the DBMS identifier is stored in a "Vol1" volume.

Next, a job definition and its parameter table will be described with reference to FIG. 6 or 9.

Figure 6A:
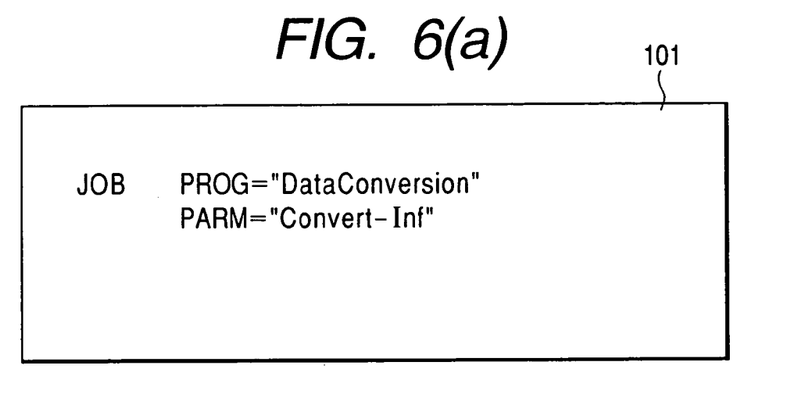
FIGS. 6A, 6B, and 6C are schematic diagrams illustrating job definitions according to the present invention.
Figure 6B:
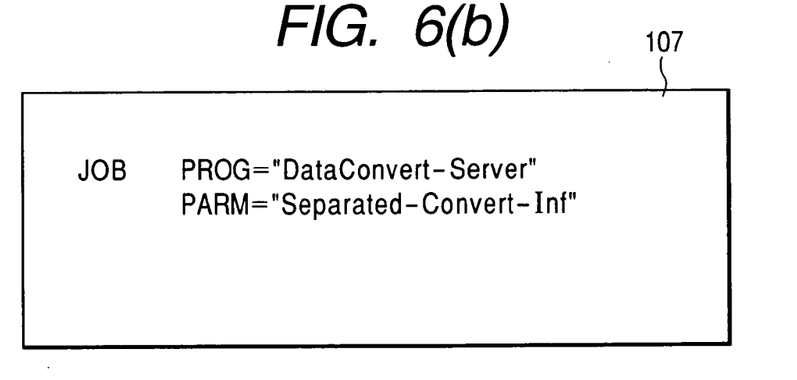
Figure 6C:
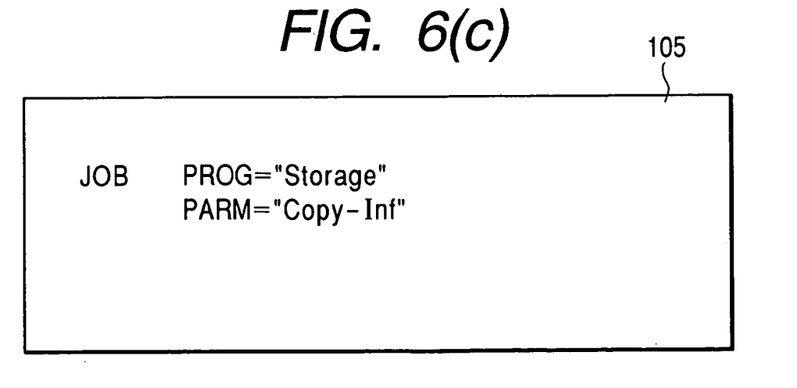

FIGS. 6A, 6B, and 6C are schematic diagrams illustrating job definitions according to the present invention.

Figure 7:
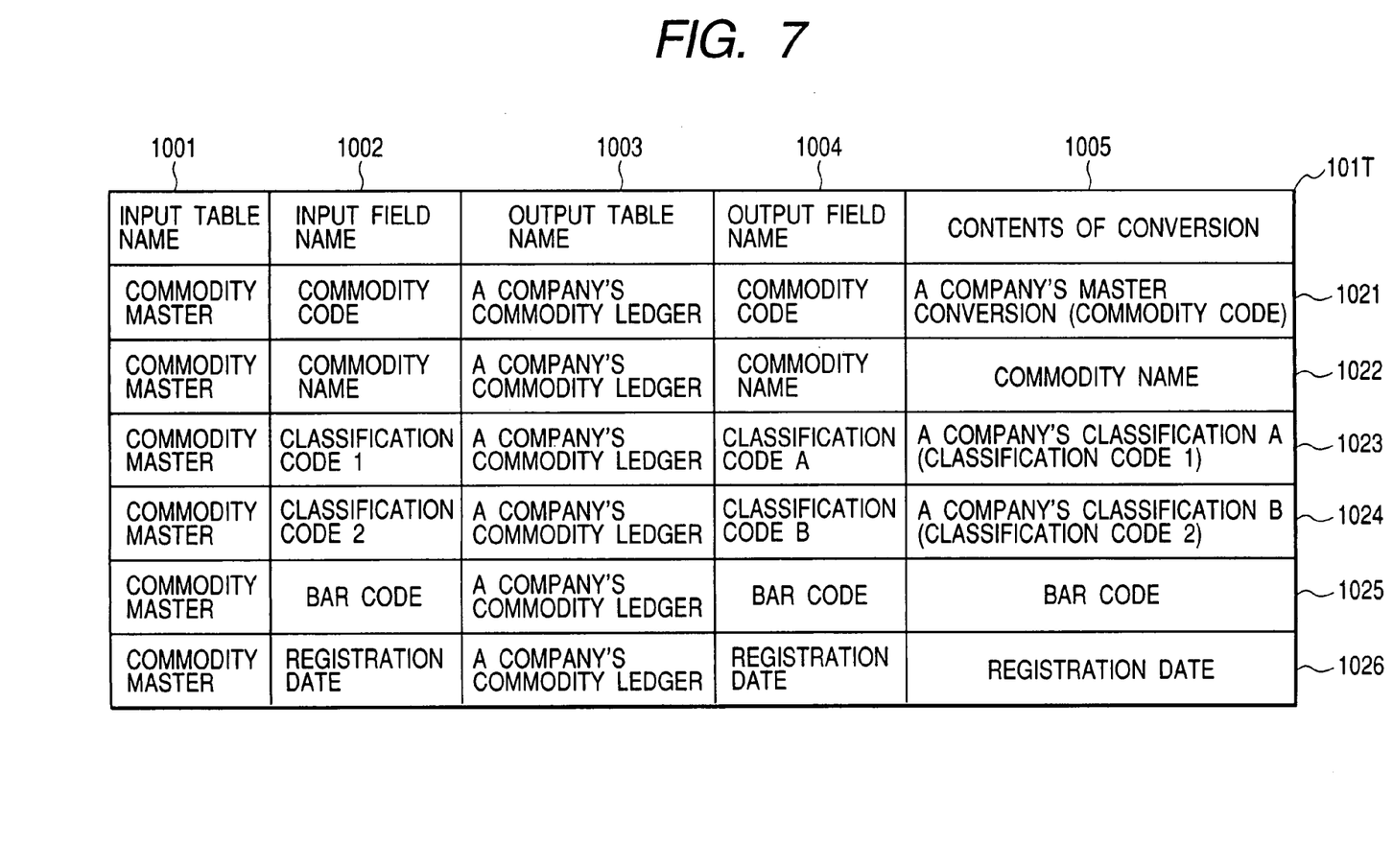
FIG. 7 is a schematic diagram illustrating a parameter table 101T of a data conversion job definition.

FIG. 7 is a schematic diagram illustrating a parameter table 101T of a data conversion job definition.

Figure 8:
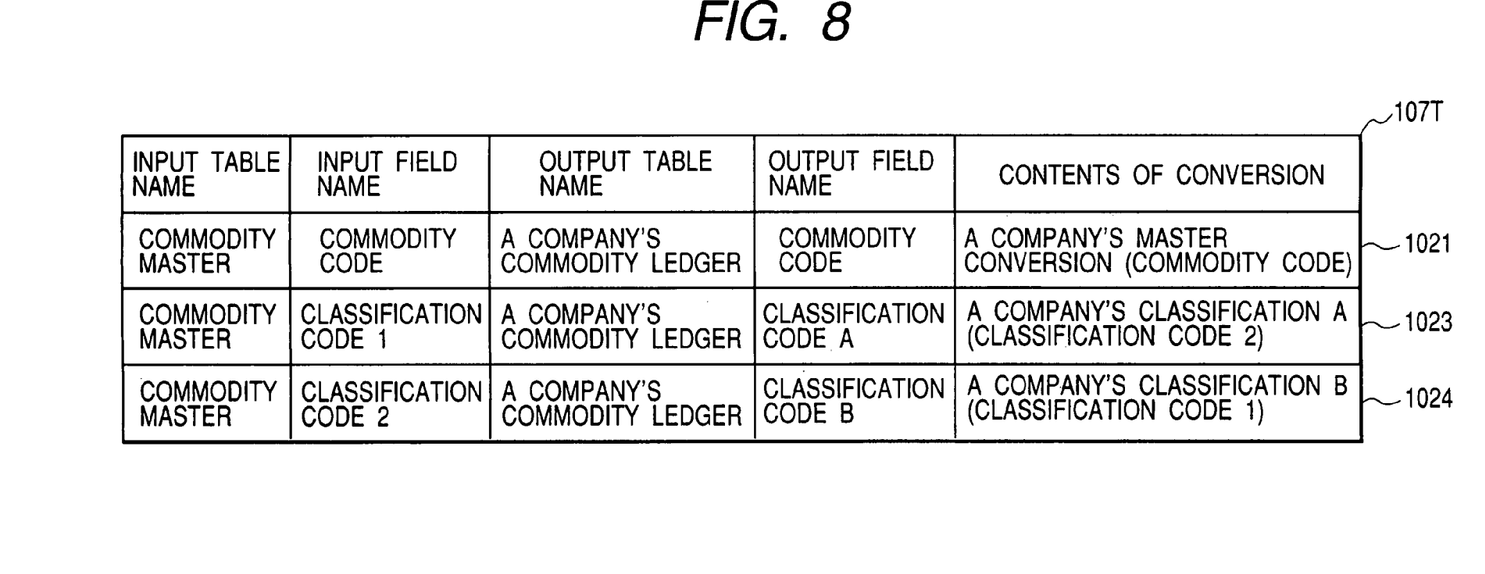
FIG. 8 is a schematic diagram illustrating a parameter table 105T of a data conversion server job definition.

FIG. 8 is a schematic diagram illustrating a parameter table 107T of a data conversion server job definition.

Figure 9:
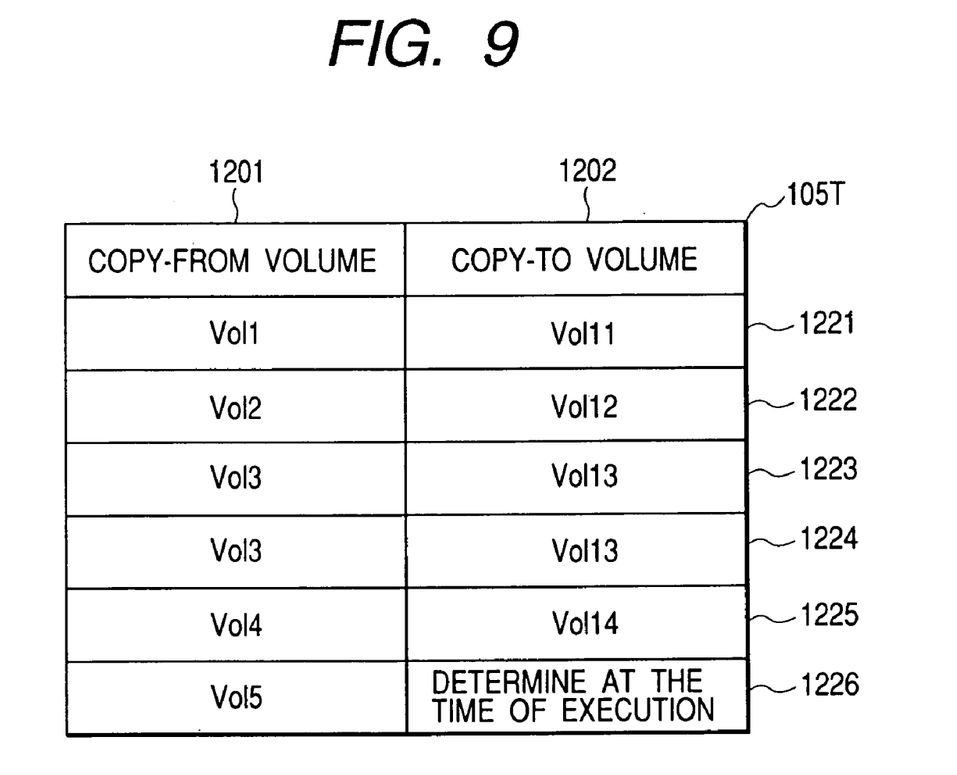
FIG. 9 is a schematic diagram illustrating a parameter table 107T of a storage job definition.

FIG. 9 is a schematic diagram illustrating a parameter table 105T of a storage job definition.

The job definition is described as shown in FIGS. 6A, 6B, 6C. A module name of job execution is specified on the right side of PROG=. A parameter table is specified on the right side of PARM=. Although the parameter table will be described next, this is a table used to define parameters to be passed to a module for job execution.

Here, FIG. 6A is a description example of the data conversion job definition 101 that is a job definition of a data conversion job; FIG. 6B is a description example of the data conversion server job definition 107 that is a job definition of a data conversion server job; and FIG. 6C is a description example of the storage job definition 105 that is a job definition of a storage job.

Heretofore, the job execution engine 109 was requested to execute the data conversion job definition 101. However, according to the present invention, in the data conversion job separating step shown in FIG. 1, the job definition in FIG. 6A is separated into the data conversion server job definition 107 in FIG. 6B and the storage job definition 105 in FIG. 6C, both of which are then executed by the job execution engine 109 to achieve separate execution of the data conversion job.

Incidentally, specific processing which accompanies each job execution will be described in detail later.

As shown in FIG. 7, the parameter table 101T of the data conversion job definition 101 has the following fields: an input table name 1001, an input field name 1002, an output table name 1003, an output field name 1004, and contents of conversion 1005. Four fields in front describe a table name, and a field name, to be inputted for conversion, and a table name and a field name that have been converted.

The contents of conversion 1005 is a field that describes how to convert data of an inputted field. Here, the following arrangements are made: if an input field name is described just as it is, this means that data is output just as it without conversion; and if data should be converted according to a certain regular rule, both of conversion description used for conversion and an input field name are described in the contents of conversion 1005. Although the "conversion description" is not shown in the figure, it is a code that defines a conversion method.

For example, as for the record 1021, the field "commodity code" of the "commodity master" is converted according to conversion description of "A company's master conversion", and is then output to the field "commodity code" of the "A company's commodity ledger".

As a result, for example, data "A0001" of the commodity code 610 in the record 681 shown in FIG. 3 is converted into data "&81&01" of the commodity code 710 in the record 781 shown in FIG. 4.

In a similar manner, as for the record 1023, the field "classification code 1" of the "commodity master" is converted according to conversion description of "A company's classification A", and is then output to the field "classification code A" of the "A company's commodity ledger".

As a result, for example, data "660" of the classification code A:630 in the record 681 shown in FIG. 3 is converted into data "660-A1PS" of the classification code A730 in the record 781 shown in FIG. 4.

On the other hand, as for the record 1022, the field "commodity name" of the "commodity master" is output to the field "commodity name" of the "A company's commodity ledger" just as it is without conversion.

Here, it is to be noted that in the example shown in FIG. 7, records in which the conversion description is defined are the records 1021, 1023, and 1024.

As is the case with the parameter table 101T of the data conversion job definition 101, as shown in FIG. 8, the parameter table 107T of the data conversion server job definition 107 has the following fields: an input table name, an input field name, an output table name, an output field name, and contents of conversion.

The parameter table 107T is formed by extracting only records, the contents of conversion 1005 of which defines conversion description, from records in the parameter table 101T of the data conversion job definition 101.

As shown in FIG. 9, the parameter table 105T of the storage job definition 105 has a copy-from volume 1201 and a copy-to volume 1202.

In the data conversion job separating step 103, each record of the parameter table 105T is created corresponding to each record in the parameter table 101T of the data conversion job definition 101 shown in FIG. 7 with reference to the table volume mapping information 150.

The copy-from volume 1201 can be obtained by matching the input table name 1001 and the input field name 1002, which are information about a copy-from table of the parameter table 101T, with contents of the storage device volume 340 of the table volume mapping information 150.

In addition, the copy-to DB table name 1202 can be obtained by matching the output table name 1003 and the output field-name 1004, which are information about a copy-to table of the parameter table 101T, with contents of the storage device volume 340 of the table volume mapping information 150.

For example, with reference to the input field name 1002 "commodity code" of the input table name 1001 "commodity master" in the record 1021, "Vol1" is extracted by use of the record 351 of the table volume mapping information 150, and is then stored in a field of the copy-from volume 1201 in the record 1221.

Additionally, with reference to the output field name 1004 "commodity code" of the output table name 1003 "A company's commodity ledger" in the record 1021, "Vol1" is extracted by use of the record 351 of the table volume mapping information 150, and is then stored in a field of the copy-from volume 1201 in the record 1221.

The parameter table 105T of the job definition of this storage job is passed to the storage 130 by executing a storage job. According to a given instruction, the storage 130 copies the volume by means of a volume copy function.

Incidentally, the copy-to volume 1202 in the record 1226 is "determine at the time of execution". This means that instead of determining the copy-to volume at the time of creating the storage job definition 105, a volume is assigned at the time of executing the storage job, and then a copy is made.

Moreover, the example of this embodiment is so devised that all volumes are copied. However, the following method may also be used: at a stage of job separation, generating, as records of the parameter table 105T, only the records 1222, 1225, 1226 relating to fields that are not converted, and then copying only volumes relating to them; and additionally creating a volume for storing fields to be converted, and storing the fields as new data in the volume.

[Processing of Data Conversion]

Next, processing of the data conversion method according to the present invention will be described in detail with reference to FIG. 10 or 13.

Figure 10:
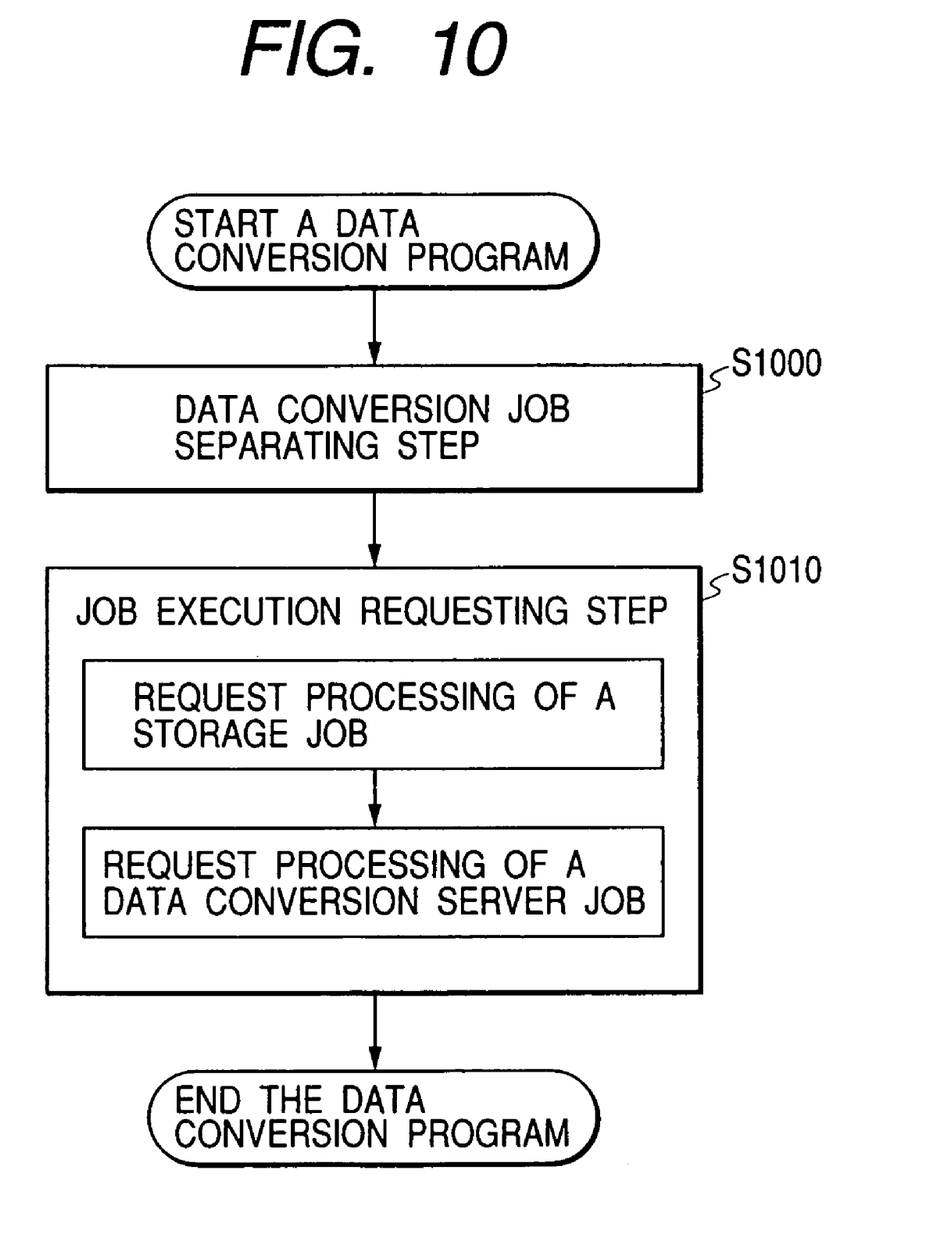
FIG. 10 is a flowchart illustrating processing of a data conversion program.

FIG. 10 is a flowchart illustrating processing of a data conversion program.

Figure 11:
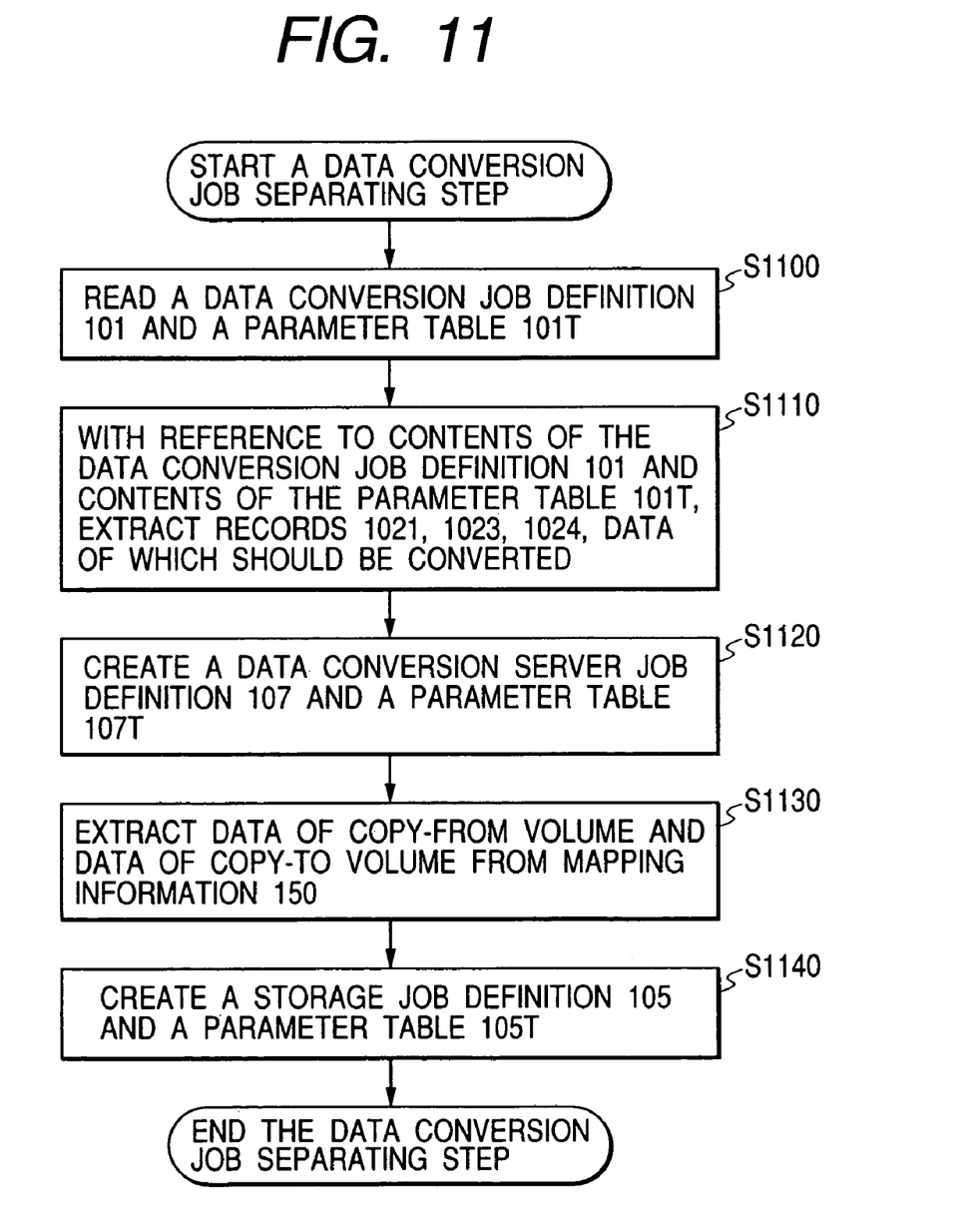
FIG. 11 is a flowchart illustrating processing of a data conversion job separation program.

FIG. 11 is a flowchart illustrating processing of a data conversion job separation program.

Figure 12:
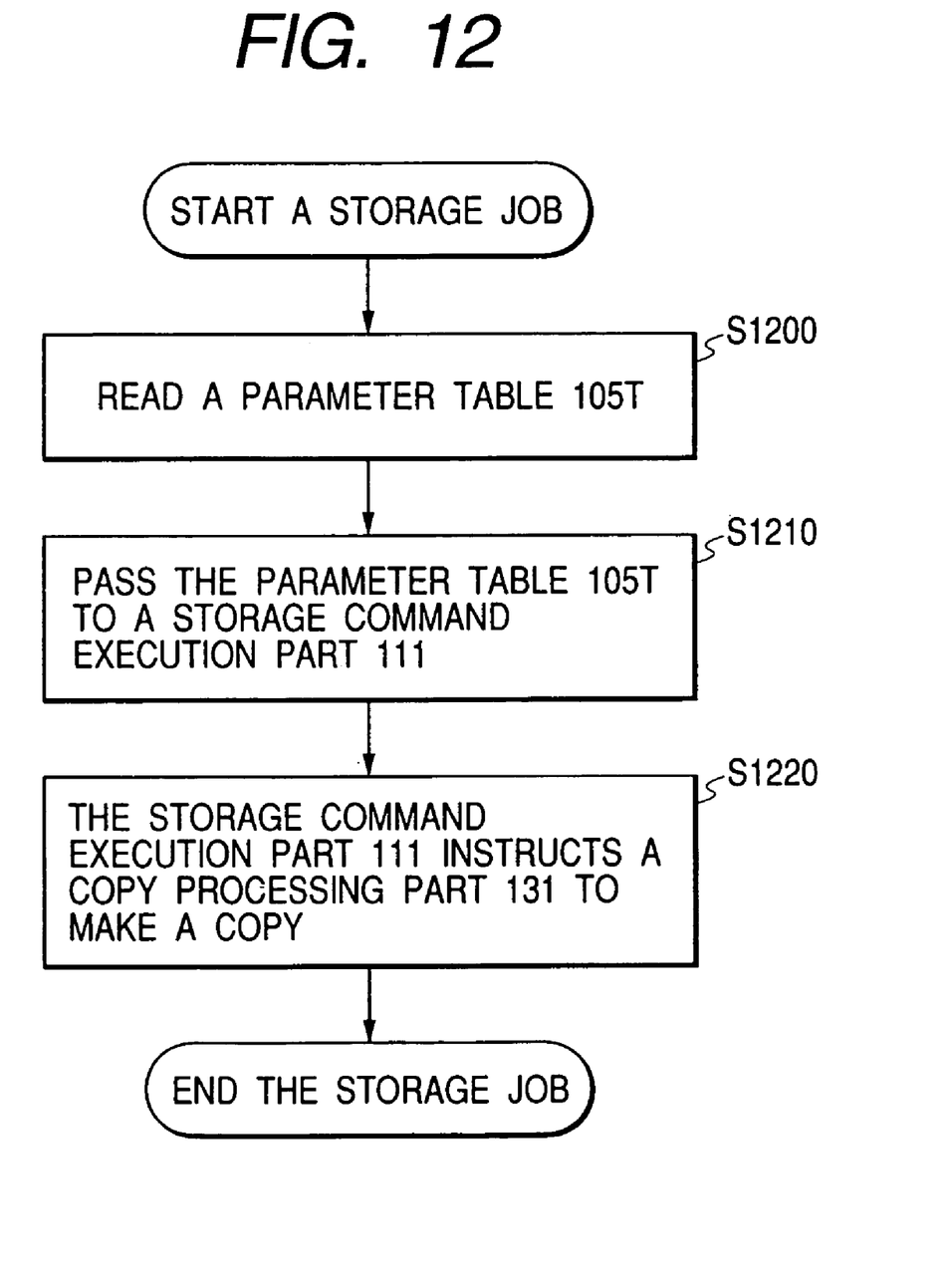
FIG. 12 is a flowchart illustrating processing of a storage job when it is executed.

FIG. 12 is a flowchart illustrating processing of a storage job when it is executed.

Figure 13:
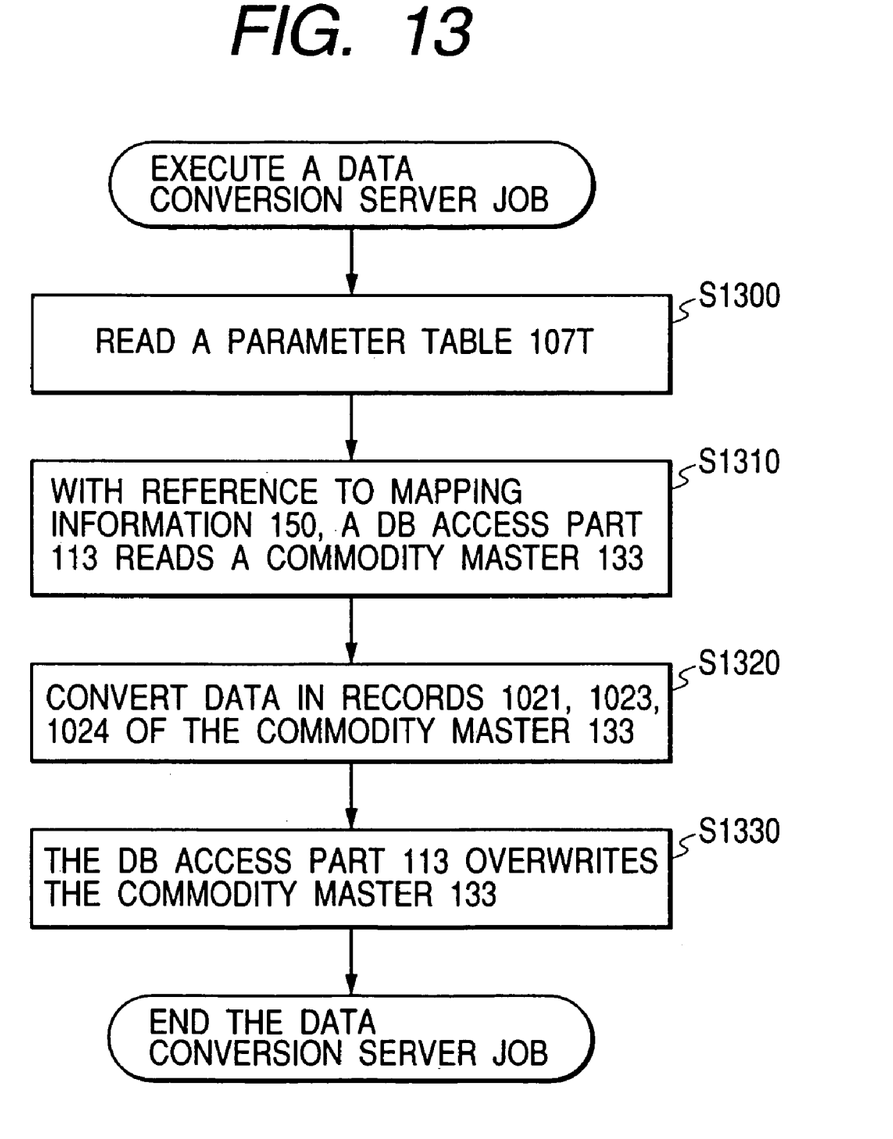
FIG. 13 is a flowchart illustrating processing of a data conversion server job when it is executed.

FIG. 13 is a flowchart illustrating processing of a data conversion server job when it is executed.

To begin with, processing of the data conversion program will be described with reference to the flowchart shown in FIG. 10.

When data conversion is performed in this system, the data conversion program is started.

The data conversion program first executes a data conversion job separating step (S1000). In this data conversion job separating step, the data conversion job definition 101 is separated into the data conversion server job definition 107 and the storage job definition 105.

Next, in a job execution requesting step (S1010), the job execution engine 109 is requested to execute a storage job and a data conversion server job.

Next, the data conversion job separating step will be described in detail with reference to the flowchart shown in FIG. 11.

In the first place, the data conversion job definition 101 in FIG. 6(a) and the parameter table 101T in FIG. 7 are read (S1100), and then with reference to the contents of conversion 1005 of the parameter table 101T, the records 1021, 1023, 1024, data of which need to be converted, are extracted (S1110). As shown in FIG. 7, an input field of a record, the contents of conversion 1005 of which has conversion description, is a field to be converted.

Next, the data conversion server job definition 105 in FIG. 6B is created, and then on the basis of the records extracted in S910, the parameter table 107T in FIG. 8 is created (S1120). As a result, as shown in FIG. 8, records 1021a, 1023a, 1024a are generated corresponding to the records 1021, 1023, 1024.

Next, with reference to the parameter table 101T, and the table volume mapping information 150, of the data conversion job definition 101, data of the copy-from volume and data of the copy-to volume are extracted from the storage device volume 340 of the table volume mapping information 150 (S1130).

Next, the storage job definition 105 in FIG. 6C is created, and then on the basis of the copy-from volume that has been determined by S1130, the parameter table 105T in FIG. 9 is created (S1140).

For example, the table volume mapping information 150 is searched for a record, the DB table name 320 and the table field name 330 of which agree with the input table name 1001, and the input field name 1002, of the record 1021. Because the record 351 satisfies the search condition, "Vol1" is obtained from the storage device volume 340 of the record 351 of the table volume mapping information 150, and is then stored in the copy-from volume 1201. In addition, the table volume mapping information 150 is searched for a record, the DB table name 320 and the table field name 330 of which agree with the output table name 1003, and the output field name 1004, of the record 1021. Because the record 361 satisfies the search condition, "Vol11" is obtained from the storage device volume 340 of the record 361 of the table volume mapping information 150, and is then stored in the copy-to volume 1202.

Incidentally, as shown in the record 366, if a value of the storage device volume 340 is "determine at the time of execution", the value is directly stored as shown in the record 1226.

In this manner, corresponding to each of the records 1021 through 1026 of the parameter table 101T in FIG. 7, each of the records 1221 through 1226 of the parameter table 105T in FIG. 9 is created.

Next, processing performed when executing a storage job will be described with reference to FIG. 12.

A storage job is started when the job execution engine 109 is requested to execute the storage job.

As soon as a request to execute a storage job is made, the parameter table 105T is first read (S1200). Then, the parameter table 105T is passed to the storage command execution part 111 (S1210).

The storage command execution part 111 specifies a copy-from volume and a copy-to volume, and thereby instructs the copy processing part 131 of the storage 130 to execute a copy (S1220).

For example, by use of the description of the record 1221 in the parameter table 105T, "Vol1" as a parameter of the copy-from volume and "Vol11" as a parameter of the copy-to volume are passed to the copy processing part 131 of the storage 130.

According to the parameters, the copy processing part 131 copies contents of "Vol1" to "Vol11".

In addition, although it is not shown in FIG. 12, if the copy-to volume 1202 is "determine at the time of execution" as shown in the record 1226 in FIG. 9, a value of the copy-to volume determined at the time of execution is written to the storage device volume 340 of the table volume mapping information 150.

In the example of this embodiment, for example, a value of "Vol11" is written to the storage device volume 340 of the record 366 of the table volume mapping information 150.

Next, processing performed when executing a data conversion server job will be described with reference to FIG. 13.

A data conversion server job is started when the job execution engine 109 is requested to execute the data conversion server job.

As soon as a request to execute a data conversion server job is made, the parameter table 107T is first read (S1300).

After that, with reference to the table volume mapping information 150, the DB access part 113 obtains the commodity master 133 (S1310), and then according to descriptions in the contents of conversion 1005 of the records 1021, 1023, 1024, field data of the commodity master 133 is converted (S1320).

Lastly, with reference to the table volume mapping information 150, the DB access part 113 overwrites the converted data to appropriate fields of the A company's commodity ledger 135 (S1330).

As a result, for example, according to the conversion description "A company's master conversion" in the contents of conversion of the record 1021 of the parameter table 107T in FIG. 8, data "A0001" and "A0002" in the commodity code 610 of the commodity master 133 in FIG. 3 are converted into "&81&01" and "&81&02" respectively as shown in the commodity code 710 of the A company's commodity ledger 135 in FIG. 4 before the converted data are stored.

Converted data are overwritten to only fields of the commodity code 710, the classification code 730, and the classification code 740, which are described in the parameter table 107T in FIG. 8, among the fields of the A company's commodity ledger 135. As for the other fields, data copied from the commodity master 133 is kept just as it is.

Effect of the Invention that can be Understood from the Embodiments

According to the present invention, it is possible to provide a method that can reduce a load of a data conversion server when converting data of a database, and that enables a designer of a data conversion job to easily design the data conversion job.

The invention claimed is:

1. A data conversion method for converting table data of a database, the data conversion method executed on a data conversion system including:

a data conversion server having table volume mapping information, and a storage including at least one volume, said data conversion method comprising:

separating, by execution of a data conversion program stored upon a medium of the data conversion server, a data conversion job used for data conversion into a data conversion server job for executing conversion processing on the data conversion server and a storage job for instructing to make a copy of a table on a volume of the storage, wherein the separating of the data conversion job into the data conversion server job and the storage job includes:

creating a parameter table of the data conversion server job by extracting and converting records from a parameter table of the data conversion job; and creating a parameter table of the storage job by extracting and converting records from the parameter table of the data conversion job and the table volume mapping information;

executing, by a job execution engine of the data conversion server, the storage job to instruct the storage to copy the volume of the storage including the table based on the parameter table of the storage job and to store the copied volume on the storage; and executing, by the job execution engine of the data conversion server, the data conversion server job to perform data conversion of the table included in the copied volume based on the parameter table of the data conversion server job.

2. A data conversion method according to claim 1, wherein:

in separating the data conversion job into the data conversion server job and the storage job, with reference to table volume mapping information used to associate the table of the database with information of the volume in which the table is stored, information of the volume in which the table is stored is included in the parameter table of the storage job.

3. A data conversion method according to claim 1, wherein:

said data conversion server job extracts from the table to be converted only fields which need to be converted, and then converts the extracted fields.

4. A data conversion method according to claim 1, wherein:

said data conversion server job refers to the table volume mapping information that associates the table of the database with the information of the volume in which the table is stored.

5. A computer system comprising:

a database conversion server for converting a table of a database, having table volume mapping information; and storage for storing the database in volumes;

wherein said database conversion server has table volume mapping information that associates the table of the database with volume in which the table is stored, said database conversion server being configured to:

separate a data conversion job used for data conversion into a data conversion server job for executing conversion program stored upon a medium on the database conversion server and a storage job for instructing to make a copy of the table on the storage, wherein the separating of the data conversion job into the data conversion server job and the storage job includes:

creating a parameter table of the data conversion server job by extracting and converting records from a parameter table of the data conversion job; and creating a parameter table of the storage job by extracting and converting records from the parameter table of the data conversion job and the table volume mapping information;

execute, by a job execution engine of the data conversion server, the storage job to instruct the storage to copy the volume including the table based on the parameter table of the storage job and to store the copied volume on the storage; and execute, by a job execution engine of the data conversion server, the data conversion server job to perform data conversion of the table included in the copied volume based on the parameter table of the data conversion server job.

6. A database conversion server for converting a table of a database, said database conversion server having table volume mapping information and being connected to storage for storing the database in volumes, said database conversion server comprising:

a module configured to separate a data conversion job definition used for data conversion into a data conversion server job definition for executing conversion program stored upon a medium on the database conversion server and a storage job definition for instructing to make a copy of the table on the storage, wherein the module configured to separate the data conversion job definition into the data conversion server job definition and the storage job definition is further configured to:

create a parameter table of the data conversion server job definition by extracting and converting records from a parameter table of the data conversion job; and create a parameter table of the data storage job definition by extracting and converting records from the parameter table of the data conversion job and the table volume mapping information;

a job execution engine configured, upon request, to execute the storage job definition, and thereby the storage is instructed to copy a volume of the storage to create a copied volume on the storage, wherein the copied volume includes the table included in the parameter table of the storage job definition; and the job execution engine configured, upon request, to execute the data conversion server job definition, and thereby only fields which need to be converted are extracted from the table included in the copied volume, and then the extracted fields are converted.

7. A database conversion server according to claim 6, wherein:

when separating the data conversion job definition into the data conversion server job definition and the storage job definition, with reference to table volume mapping information used to associate the table of the database with information of the volume in which the table is stored, both a volume in which a copy-from table is stored and a volume in which a copy-to table is stored are written to the parameter table of the storage job.

8. A data conversion server according to claim 6, wherein:
with respect to the table to be converted, fields which need to be converted are described in the data conversion server job definition, and according to the description of the fields, only the fields which need to be converted are extracted from the table included in the copied volume, and then the extracted fields are converted.

9. A database conversion server according to claim 6, wherein:
when the job execution engine is requested to execute the data conversion server job definition, a copy-from table and a copy-to table are accessed with reference to table volume mapping information used to associate the table of the database with information of the volume in which the table is stored.

10. A data conversion program for converting table data of a database, said data conversion program comprising:
code for separating a data conversion job definition used for data conversion into a data conversion server job definition for executing a conversion program stored upon a medium on a data conversion server having table volume mapping information and a storage job definition for instructing to make a copy of a table on a storage including at least one volume, wherein the code for separating of the data conversion job definition into the data conversion server job definition and the storage job definition includes:
code for creating a parameter table of the data conversion server job definition by extracting and converting records from a parameter table of the data conversion job definition; and
code for creating a parameter table of the data storage job definition by extracting and converting records from the parameter table of the data conversion job definition and the table volume mapping information;
code for requesting a job execution engine of the data conversion server to execute the storage job definition, and thereby the storage is instructed to copy a volume of the storage to create a copied volume on the storage, wherein the copied volume includes the table included in the parameter table of the storage job definition; and
code for requesting the job execution engine of the data conversion server to execute the data conversion server job definition to perform data conversion of the table included in the copied volume, the data conversion based on the parameter table of the data conversion server job definition.

11. A data conversion program according to claim 10, wherein:
both a volume in which a copy-from table is stored and a volume in which a copy-to table is stored are described in the parameter table of the storage job definition.

12. A data conversion program according to claim 10, wherein:
with respect to the table to be converted, fields which need to be converted are described in the parameter table of the data conversion server job definition.

\* \* \* \* \*